(No Model.)
2 Sheets—Sheet 1.

E. WALDRON.
CLUTCH.

No. 480,796. Patented Aug. 16, 1892.

WITNESSES:
Harry Bacon
J. C. Shaw

INVENTOR
Edward Waldron (No Model.) 2 Sheets—Sheet 2.

E. WALDRON.
CLUTCH.

No. 480,796. Patented Aug. 16, 1892.

WITNESSES:
Harry Bacon
J. C. Shaw

INVENTOR
Edward Waldron

UNITED STATES PATENT OFFICE.

EDWARD WALDRON, OF PHILADELPHIA, PENNSYLVANIA.

CLUTCH.

SPECIFICATION forming part of Letters Patent No. 480,796, dated August 16, 1892.

Application filed June 28, 1890. Renewed May 11, 1892. Serial No. 432,673. (No model.)

*To all whom it may concern:*

Be it known that I, EDWARD WALDRON, a British subject, residing in the city of Philadelphia, State of Pennsylvania, have invented a new and useful Improvement in Friction-Clutches, of which invention the following is a specification.

This invention relates to that class of friction-clutches designed for the transmission of power by means of clamping the opposite sides of an inwardly-projecting clutch-flange.

The primary objects of this invention are the production of a clutch which shall be flexible, and shall also be efficient, durable, and free from complexity, and which shall be of the least possible weight and take up the least possible space on the shaft in proportion to its capacity to transmit power.

Figure 1:
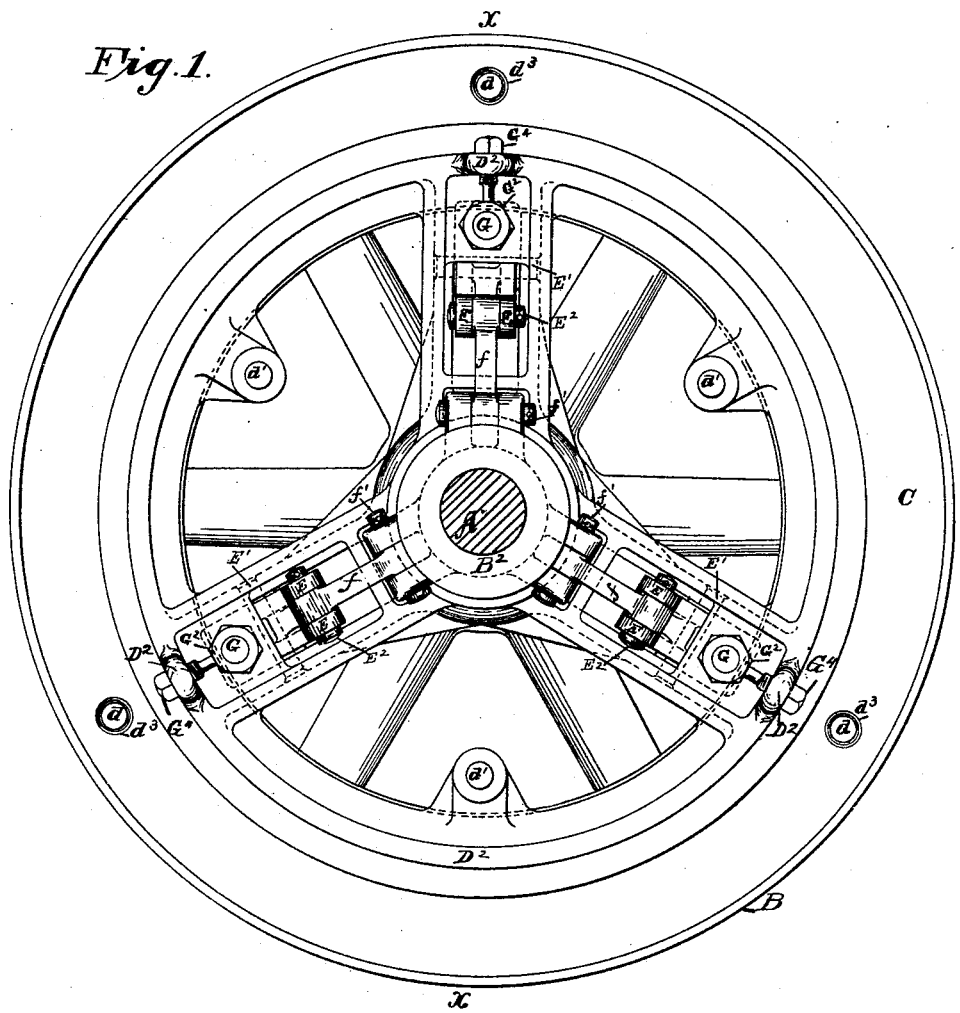
Figure 2:
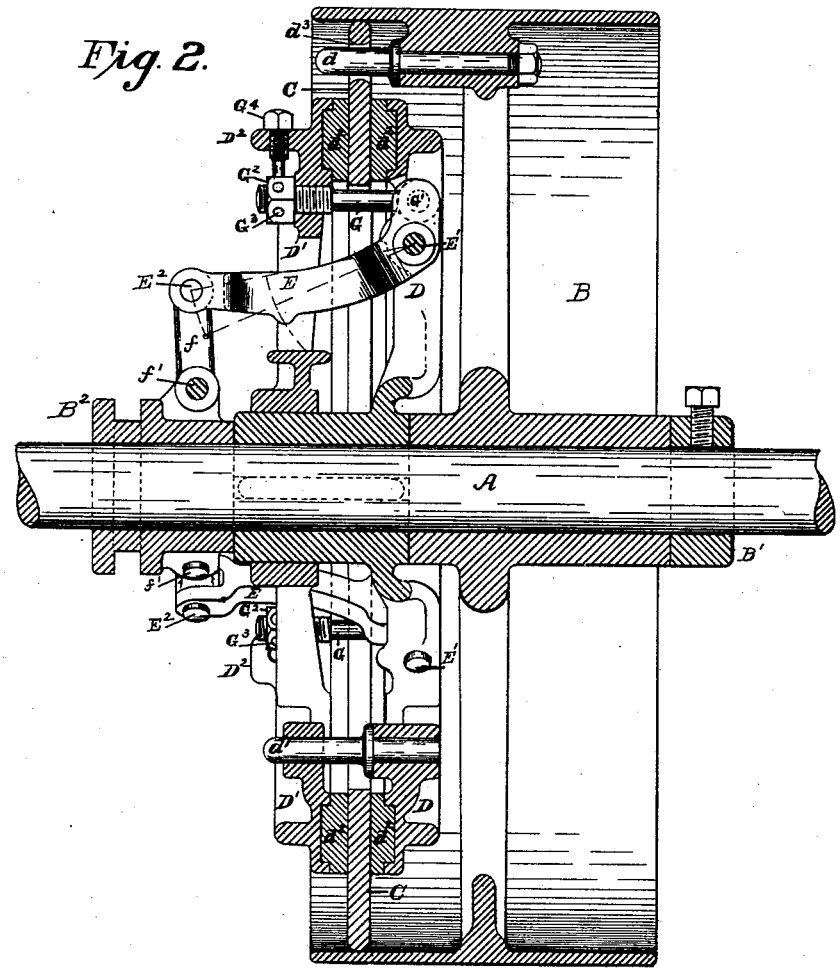

In the accompanying drawings, Figure 1 is a face view of a friction-clutch constructed in accordance with my invention. Fig. 2 is a vertical section of the same on the line $x\ x$ of Fig. 1.

In the drawings like letters indicate the same parts in each figure.

The shaft A has mounted thereon a loose pulley B. The hub of this pulley is kept in contact with that of the clutch member D by means of the collar B′, bearing against the other end of the hub of the pulley. The collar B′ is held in place on the shaft by means of a set-screw.

C is a clutch-ring fitted to the inner side of the rim of the pulley B. It is loosely fitted, so as to give it freedom of lateral movement, and its outer edge is rounded, as shown, for the purpose of allowing oscillatory movement. The pins $d$, which are fastened in the pulley B, project through holes or openings $d^3$ at or near to the periphery of the ring C. The diameter or width of each hole or opening $d^3$ is greater than that of the pin which passes through it, and the said holes or openings are flared, as shown in Fig. 2, with the object of retaining for the ring C freedom of lateral and oscillatory movements on the pins $d$. The object of this arrangement is to so connect the clutch-ring C to the pulley or other object from or to which power is to be received or transmitted that while the said ring and pulley or other object must move rotatably in unison they shall be respectively independent as regards lateral or oscillatory movements, and in this manner avoid destructive strains or the friction due to shafts being out of line or deflected or having a lateral movement. This feature of flexibility is especially important where the clutch is used to couple shafts.

The clutch members D and D′ are made in the form of disks or wheels. The clutch member D is placed so that its periphery extends between the clutch-ring C and the pulley B, and the hub of said clutch member is rigidly keyed to the shaft. The clutch member D′ is placed on the opposite side of the clutch-ring C. This clutch member D′ is free to move in line with the axis of the shaft, but is held to rotative movement with the clutch member D by means of pins $d'$, which are fastened in the said member D and pass with a sliding fit through the clutch member D′. Those portions of the clutch members D and D′ having frictional contact with the clutch-ring C are faced with wood or other suitable material $d^2$.

The clutch member D has pivoted to it at E′ the levers E, and the long arms of said levers pass through openings in the clutch member D′ and are connected to the sleeve B² by means of the links $f$ and the pins E² and $f'$. This arrangement secures compactness—as, for instance, were the levers pivoted to the clutch member D′ they would project much farther out—and it is desirable and often necessary that a clutch shall not occupy much space on the shaft, and in addition to this it also has the advantage of bringing the threaded ends of the adjusting-pieces G through the clutch member D′, so that the adjustment is effected on the outside of the face of this clutch member. The short arms of said levers E are connected by pins G′ to the adjusting-pieces G, which project through suitable holes in the clutch member D′, and the projecting ends are threaded and have screwed on them the nuts G², and said nuts abut against the clutch member D′. The nuts G² have bored into them the holes G³ for the purpose of receiving the points of the screws G⁴, which screws are held by the lugs D², which project from the clutch member D′, and so set the screws G⁴ hold the nuts G² in fixed contact with both the adjusting-pieces G and the clutch member D′.

It will now be seen that the main features of this invention are a clutch-ring having freedom of lateral and oscillatory movements and clutch members for grasping the opposite sides of said ring, the member nearest the sleeve having freedom of lateral movement and the member nearest the pulley or other object from or to which power is received or transmitted being rigidly fastened to the shaft, and the pivoting of the levers to this latter member.

The operation of this clutch is as follows: To release it from engagement, the sleeve $B^2$ is moved away from the hub of the clutch member D. This causes the long arms of the levers E to swing toward the shaft and the short arms to swing toward the clutch member D', and as said arms are pinned to the adjusting-pieces G, the nuts $G^2$ of which are held to contact with the clutch member D' by means of screws $G^4$, the said member is thrust away from contact with the clutch-ring C, which ring being free to move laterally releases itself from contact with the clutch member D. To move the clutch into engagement the sleeve is moved back into contact with the hub of the clutch member D, thus forcing the long arms of the levers to swing outwardly from the shaft and the short arms to swing in a direction away from the clutch member D', pulling the said member with it into contact with the ring C, which is thus forced into contact with the clutch member D and clutched between both of said members. When it is desired to increase the grip of the clutch members on the clutch-ring, the screws $G^4$ are screwed out from contact with the nuts $G^2$, and said nuts are then screwed farther onto the adjusting-pieces G. In screwing the nuts $G^2$ care should be taken with each nut at the finish to bring one of the holes $G^3$ into line with its respective screw $G^4$, which should then be screwed in until its point has entered the hole and its head bears firmly on the lug $D^2$.

I claim—

1. In a friction-clutch, the combination of a shaft, a sleeve movable lengthwise on said shaft, a ring, clutch members for grasping the opposite sides of the ring, lateral pins for loosely supporting said ring, the outer edge or periphery of said ring being rounded, substantially as shown, and for the purpose set forth, and lever mechanism connected with said sleeve and clutch members to cause the latter to clamp or release said ring.

2. In a friction-clutch, the combination, substantially as set forth, of a shaft, a sleeve movable lengthwise on said shaft, a clutch-ring loosely supported by connection at its outer edge to another part of the device, and clutch members for gripping the opposite sides of said ring, the clutch member extending farthest from the sleeve being rigidly fastened to the shaft, and levers fulcrumed to said member, having their long arms linked to the sleeve and their short arms attached to an adjusting-piece connected to the opposite clutch member, substantially as set forth.

3. In a friction-clutch, the combination of a shaft, a sleeve movable lengthwise on said shaft, a ring C, clutch members D and D' for gripping the opposite sides of the ring, said ring being flexibly connected at its outer edge to another part of the device, the clutch member D extending farthest from the sleeve being rigidly fastened to the shaft, levers E, fulcrumed to member D and connected to the opposite member D' and to sleeve $B^2$, and pins $d$, secured in the pulley B and extending through the ring C at or near the outer edge of said ring, substantially as and for the purposes set forth.

4. In a friction-clutch, the combination of a shaft, a sleeve movable lengthwise on said shaft, a ring, clutch members for grasping the opposite sides of the ring, said ring being loosely connected at or near its outer edge to another part of the device, pins $d'$, secured, substantially as shown, to one of said members and passing through the opposite member for the purpose set forth, and lever mechanism connected with said sleeve and clutch members to cause the latter to clamp or release said ring, substantially as set forth.

5. In a friction-clutch, the combination of a shaft, a sleeve movable lengthwise on said shaft, a ring, clutch members for grasping the opposite sides of the ring, said ring being loosely connected at or near its outer edge to another part of the device and having at or near its outer edge holes or openings flared toward the said opposite sides of the ring, and projections from said other part of the device entering said holes, substantially as shown, and for the purpose set forth, and lever mechanism connected with said sleeve and clutch members to cause the latter to clamp or release said ring.

6. In a friction-clutch, the combination of a shaft, a sleeve movable lengthwise on said shaft, the ring C, clutch members D and D', levers E, adjusting-pieces G, lugs $D^2$, nuts $G^2$, and screws $G^4$, which have contact with said nuts, substantially as and for the purpose set forth.

EDWARD WALDRON.

Witnesses:
J. E. SHAW,
CHARLES C. BLIGHT.